United States Patent
Takeda

(10) Patent No.: US 8,937,999 B2
(45) Date of Patent: Jan. 20, 2015

(54) MOVING IMAGE COMPRESSION ENCODING APPARATUS, METHOD, AND CONTROL PROGRAM

(75) Inventor: Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 13/603,981

(22) Filed: Sep. 5, 2012

(65) Prior Publication Data

US 2013/0083847 A1  Apr. 4, 2013

(30) Foreign Application Priority Data

Sep. 29, 2011 (JP) ................. 2011-215128

(51) Int. Cl.
*H04N 7/00* (2011.01)
*H04N 19/61* (2014.01)
*H04N 19/436* (2014.01)
*H04N 7/12* (2006.01)

(52) U.S. Cl.
CPC ... *H04N 19/00781* (2013.01); *H04N 19/00521* (2013.01)
USPC .......................................................... 375/240

(58) Field of Classification Search
USPC ........................................ 375/240.12, 240.26
See application file for complete search history.

(56) References Cited

U.S. PATENT DOCUMENTS

| | | | | |
|---|---|---|---|---|
| 5,909,468 A * | 6/1999 | Lawrence | ...................... | 375/295 |
| 5,929,930 A * | 7/1999 | Kurokawa | ...................... | 348/568 |
| 7,027,517 B1 * | 4/2006 | Nagai et al. | .............. | 375/240.28 |
| 7,796,653 B2 * | 9/2010 | Kim | .............................. | 370/542 |
| 8,503,490 B2 * | 8/2013 | Todo et al. | ..................... | 370/535 |
| 8,582,642 B2 * | 11/2013 | Kwon et al. | .............. | 375/240.01 |
| 8,724,695 B2 * | 5/2014 | Bock | ......................... | 375/240.01 |
| 2006/0008012 A1 * | 1/2006 | Nagai et al. | .............. | 375/240.28 |
| 2006/0140281 A1 * | 6/2006 | Nagai et al. | .............. | 375/240.28 |
| 2009/0214178 A1 * | 8/2009 | Takahashi | ....................... | 386/84 |
| 2013/0287122 A1 * | 10/2013 | Mizosoe et al. | ......... | 375/240.26 |

FOREIGN PATENT DOCUMENTS

JP    4389883    12/2009

* cited by examiner

*Primary Examiner* — Sath V Perungavoor
*Assistant Examiner* — Howard D Brown, Jr.
(74) *Attorney, Agent, or Firm* — Cowan, Liebowitz & Latman, P.C.

(57) ABSTRACT

A moving image encoding apparatus decides a picture number for identifying a frame which is encoded by each encoding unit on the basis of a count value of a sync signal of an input moving image signal and a value corresponding to the number of a plurality of encoding units and notifies each encoding unit of the picture number. Each encoding unit obtains a moving image signal of the frame to be subjected to encoding among the input moving image signal, on the basis of the notified picture number and encodes the obtained moving image signal. Data encoded by a plurality of encoding units is multiplexed as a bit stream in accordance with the picture number and output.

17 Claims, 12 Drawing Sheets

MOVING IMAGE COMPRESSION ENCODING APPARATUS, METHOD, AND CONTROL PROGRAM

BACKGROUND OF THE INVENTION

1. Field of the Invention

The present invention relates to a moving image encoding apparatus, a method, and a program and, more particularly, to a technique of subjecting moving image data of a high resolution to a parallel processing using a plurality of encoding units and multiplexing a plurality of bit streams obtained from the parallel processing to output as one bit stream.

2. Description of the Related Art

In recent years, owing to an advance of a digital signal processing, a large amount of digital information such as moving image, still image, audio, and the like can be encoded at a high efficiency to be recorded into a small recording medium or transmitted by a communication medium.

A moving image encoding apparatus which can convert a moving image obtained by a television broadcasting or photographed by a video camera into an encoded stream by applying such a technique has been developed.

Further, in recent years, in an image apparatus for business use or a large-sized television, a technique for further improving image quality has been proposed. For example, there has been proposed such a technique that a resolution of a screen size of an image signal is raised to a high resolution such as 4k2k, 8k4k, or the like which is further larger than that of the HDTV (1920 pixels×1080 lines) in the related art or a frame rate is raised to a high frame rate such as 120 Hz, 240 Hz, or the like.

However, in the case of performing an encoding processing to the image signal of the large screen resolution or the high frame rate, since an amount of information which is handled is suddenly increased as compared with the image signal in the related art, such a problem that an encoder of high performance which can perform a high speed processing is newly necessary occurs.

The following related art in which the above problem is solved and even if the image signal of the high resolution or high frame rate was input, an output of an encoded stream is realized by using the encoder in the related art has also been proposed.

In the Official Gazette of Japanese Patent Registration No. 04389883, such a construction that an image input of a high frame rate is distributed to a plurality of encoding units every frame, an encoding processing is executed in parallel, and a result of the encoding processing is output as one bit stream has been proposed. Specifically speaking, such a technique that the image input distributed to each encoding unit at a low frame rate is encoded in parallel in such a frame rate period has been proposed.

The apparatus has such a means that when encoded picture data which is output from each encoding unit is multiplexed to one bit stream, header information is updated so that a frame reference relation of each encoding unit is correctly held.

According to the related arts as mentioned above, even the input image of the higher resolution or higher frame rate than that in the related art, by processing it with a plurality of encoding units in parallel, a processing load accompanied with the encoding can be distributed.

However, in the Official Gazette of Japanese Patent Registration No. 04389883 mentioned above, although the parallel system can be realized by such a simple expansion of the encoding unit itself that the encoding processing is merely executed like a related art, there is a risk that the updating processing of the header information in a composition unit for outputting a bit stream becomes complicated.

On the other hand, performance cannot be optimized by such a design change that a plurality of continuous pictures are continuously encoded in accordance with a processing ability of each encoding unit.

SUMMARY OF THE INVENTION

The present invention has been made in consideration of the above situation, and a scope of the invention is to realize a parallel encoding system using a plurality of encoding units with a simple construction in consideration of the problems in the related arts as mentioned above.

According to an aspect of the invention, there is provided a moving image encoding apparatus of the present invention comprising: a plurality of encoding units configured to encode a moving image signal and output encoded data; a distribution unit configured to output the input moving image signal on a frame basis to each encoding unit; a composition unit configured to multiplex the encoded data which is output from each encoding unit to output a bit stream; a counter unit configured to count a sync signal of a frame of the input moving image signal; and a notifying unit configured to decide a picture number for identifying the frame which is encoded by each encoding unit, on the basis of a count value of the counter unit and a value corresponding to the number of the plurality of encoding units and notify each encoding unit of the picture number of the frame which is encoded by the encoding unit, wherein each encoding unit obtains the image signal of the frame to be subjected to encoding among the input moving image signal, from the distribution unit on the basis of the picture number notified from the notifying unit and encodes the object image signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Embodiment 1

Apparatus Construction

Figure 1:
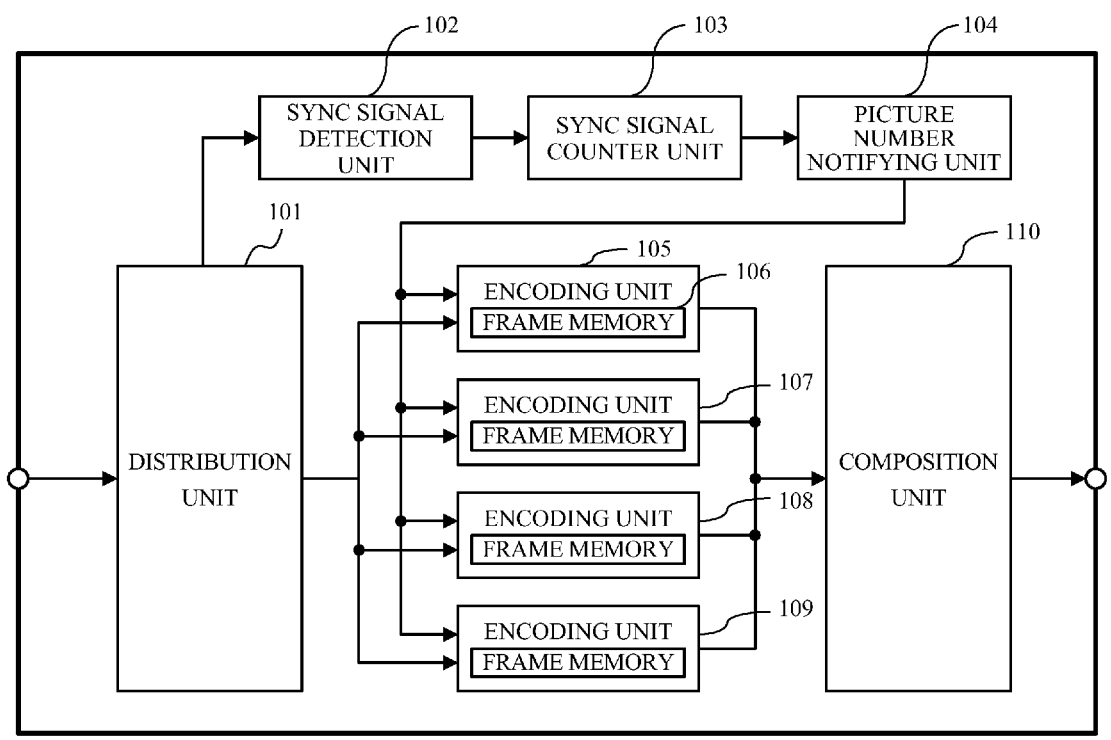
FIG. 1 is a block diagram of a moving image encoding apparatus according to a first embodiment of the invention.

FIG. 1 is a block diagram illustrating a construction of a moving image encoding apparatus according to the first embodiment of the invention.

The moving image encoding apparatus according to the embodiment is constructed by a distribution unit 101, a sync signal detection unit 102, a sync signal counter unit 103, a picture number notifying unit 104, an encoding unit 105, a frame memory 106, a second encoding unit 107, a third encoding unit 108, a fourth encoding unit 109, and a composition unit 110. It is assumed that each component element is controlled by a system controller such as a CPU (not shown) or the like for controlling the operation of the whole system and can be realized by hardware, an execution of a control program, or a combination of them.

The distribution unit 101 outputs input image data every picture to each encoding unit at the post stage for every period of time provided by dividing a frame rate of the input image signal (moving image signal) by the number of a plurality of parallel encoding units.

For example, in the case of an encoding construction having the four encoding units 105, 107, 108, and 109 as illustrated in FIG. 1, each picture (frame) of the input image signal of 60 Hz is sequentially and circulatively output to each encoding unit at a period of 15 (=60/4) Hz.

The sync signal detection unit 102 detects a sync signal for controlling transmission timing of the image data of one picture unit, such as a vertical sync signal or the like regarding the input image signal. If the sync signal is detected, a timing signal for informing a fact that the sync signal is detected is transmitted to the sync signal counter unit 103.

The sync signal counter unit 103 receives the timing signal for detection of the sync signal from the sync signal detection unit 102, counts up the number of detection times synchronously with the timing signal, and holds a count value until the next timing signal is detected. Thus, the number of pictures (picture number) of the input image signal can be counted.

It is assumed that an initialization of the sync signal counter unit 103 and enable control of the count processing can be set from the system controller for controlling the operation of the whole system, such as a CPU (not shown) or the like.

On the basis of a value of the number of detection times counted by the sync signal counter unit 103 and the number of encoding units with the parallel encoding construction, the picture number notifying unit 104 decides to which encoding unit a picture encoding start instruction is to be issued and determines the picture number which is to be set by the encoding unit at the time of encoding.

The encoding unit 105 receives the encoding start instruction and the picture number information from the picture number notifying unit 104, executes a picture encoding processing, and thereafter, outputs encoded data to the composition unit 110.

It is assumed that in the picture encoding processing, the image data of one picture which is output from the distribution unit 101 is stored into the internal frame memory 106 and the image data stored in the frame memory is used as a source image, and a compression encoding by a predetermined video encoding method is executed. As an encoding method, a method using an inter-frame prediction such as MPEG-2 method, MPEG-4 AVC (H.264) method, or the like is used. In the present embodiment, it is assumed that an encoding (motion compensation prediction encoding) using an intra-picture prediction mode of the H.264(AVC) method and an inter-frame prediction by a forward picture reference is executed unless otherwise specified.

In the encoding, with respect to the image data stored in the frame memory 106, an association with the picture number is provided and slice header information of encoded picture data is generated.

Similarly, each of the second encoding unit 107, third encoding unit 108, fourth encoding unit 109 also compression-encodes the input image data from the distribution unit 101 and outputs encoded picture data.

The composition unit 110 receives the encoded picture data which are output from each of the encoding units 105, 107, 108, and 109, multiplexes them, and outputs one bit stream which conforms with the standard of the encoding method referred to above.

The construction of the moving image encoding apparatus according to the first embodiment of the invention has been described above.

Subsequently, the operation of the moving image encoding apparatus according to the embodiment described above will be described with reference to FIGS. 2 and 3. The operation can be realized by a method whereby the system controller loads the control program corresponding to flowcharts and executes it. At least a part of the operation can be also constructed by hardware.

Picture Number Notifying Operation

Figure 2:
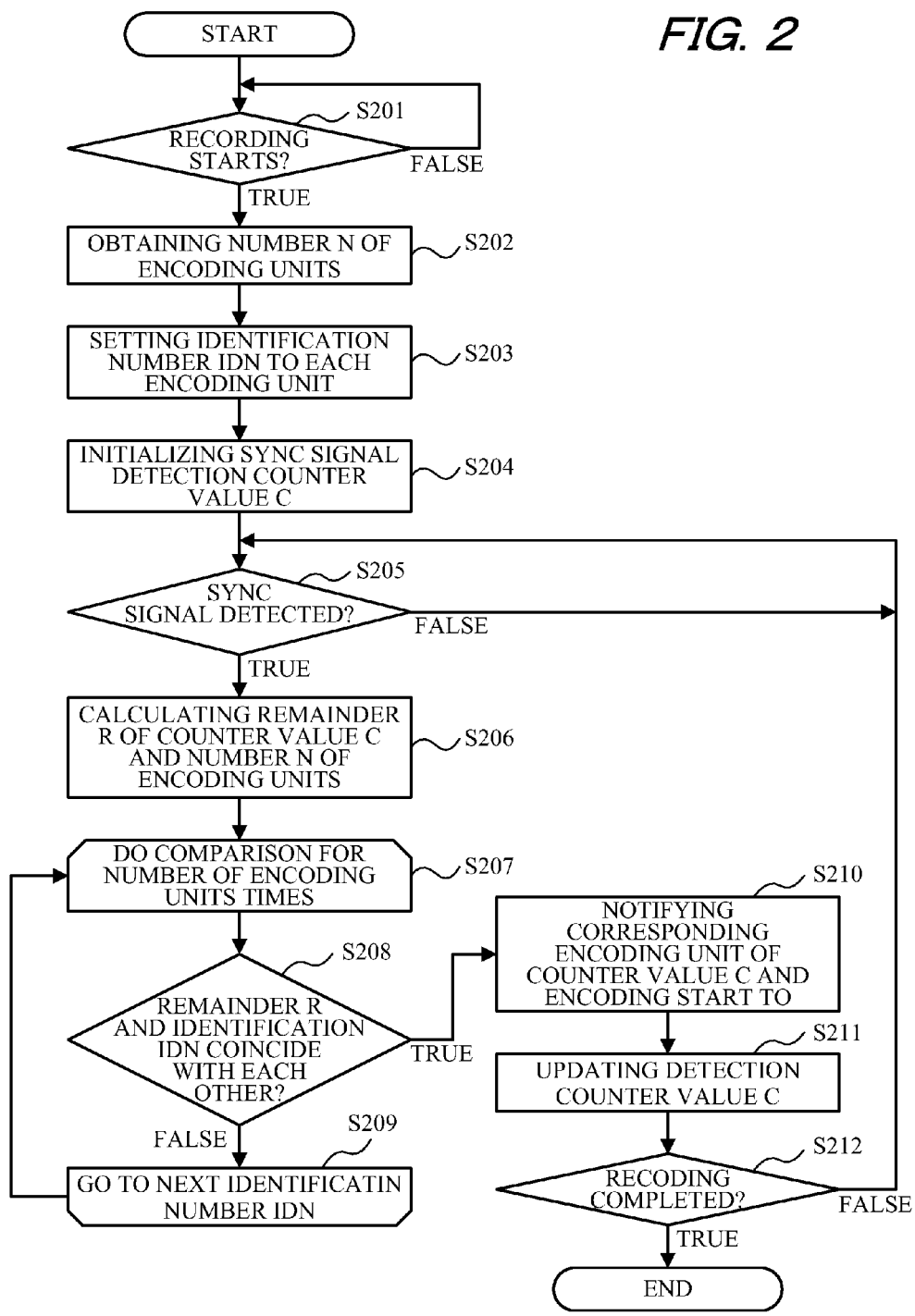
FIG. 2 is a flowchart illustrating the operation of a picture identification number setting unit apparatus according to the first embodiment of the invention.

First, the decision of the picture number and the notifying operation to the encoding unit, serving as a feature of the parallel encoding of the embodiment, will be described with reference to a flowchart of FIG. 2.

First, in step S201, whether or not the start of the recording operation is instructed in the moving image encoding apparatus is discriminated.

It is assumed that the start of the recording operation is instructed by a message based on a program provided from a microcomputer such as a CPU or the like via an interface such as operation button (not shown) for operating the moving image encoding apparatus from the outside, remote commander, or the like or by electrically instruction from a dedicated port.

If there is no recording start instruction (FALSE in step S201), a standby state is subsequently maintained until the recording start instruction is received.

If the recording start instruction is received (TRUE in step S201), the number N of a plurality of parallel encoding units 105 to 109 constructing the moving image encoding apparatus is obtained (step S202).

The number N of encoding units is obtained by, for example, a method whereby during an initialization processing which is executed after a power source of the system was turned on, the encoding units connected in the moving image encoding apparatus are detected, thereby obtaining the number N. Or, there is also a method whereby a status register for communication is provided in advance for each encoding unit and the number N is inquired from the system controller, thereby detecting the number N, or the like.

Although the above obtaining method is not particularly limited in the invention, in the case of realizing an expansion specification which enables to change dynamically a degree of parallelization of the encoding units, it is desirable to provide the dedicated status register.

Subsequently, an identification number IDN for identifying to which encoding unit a picture encoding start is instructed and identifying whether or not a picture number is notified is set into each encoding unit (step S203).

It is assumed that the identification number IDN is allocated in ascending order from a value 0. In the case of the moving image encoding apparatus of the embodiment, the identification numbers 0, 1, 2, and 3 are allocated to the four encoding units 105, 107, 108, and 109 which execute the processings in parallel, respectively.

After the identification numbers IDN are allocated, a sync signal counter value C (count value C) is initialized (step S204). It is assumed that the value 0 is set as an initial value.

After completion of the initialization processing of steps S202 to S204 mentioned above, the sync signal of the input image from the distribution unit 101 is detected by the sync signal detection unit 102 (step S205).

In the present embodiment, vertical sync signals corresponding to a period of time during which the image display of one picture is scanned from an upper edge to a lower edge of the picture are used as a prerequisite of the sync signal, particularly, when the invention is embodied, the sync signal is not limited to that in the embodiment but an arbitrary sync signal may be used so long as it is a sync signal of a time at which the image data of one frame can be encoded.

When no sync signal is detected, the sync signal detection unit 102 waits, at a precision of a time interval from an unshown clock oscillator or the like, for the sync signal to appear as a timing pulse signal (FALSE in step S205).

After the sync signal is detected (TRUE in step S205), a remainder R provided by dividing the current sync signal counter value C by the number N of encoding units obtained in step S202 is calculated on the basis of the following equation (1) (step S206).

$$R = C \bmod N \quad (1)$$

Subsequently, the picture number notifying unit 104 decides with which one of the identification numbers IDN allocated in step S203 coincides with the remainder R (step S208), on the basis of a result of a comparison which is repeated up to the number N of encoding units times (a loop of steps S207 and S209).

In step S208, if the remainder R coincides with one of the allocated identification numbers IDN (TRUE in step S208), the comparison discrimination processing is finished. The sync signal counter value C (picture number) and the encoding start instruction are notified to the encoding unit corresponding to the coincident identification number (step S210).

For example, when the number N of encoding units is equal to 4 (N=4) and the sync detection counter value C is equal to 10 (C=10), the remainder R=2 and the notification of the picture number 10 and the encoding start instruction are sent to the encoding unit of IDN=2, that is, the third encoding unit 108.

Subsequently, the sync signal counter unit 103 increments the sync detection counter value C by 1 from the current value, thereby updating it (step S211).

If the counter value C has a maximum value which is restricted due to a bit length or the like of the register to be incremented, it is assumed that when it reaches a multiple of the maximum number N of encoding units which does not exceed such a maximum value, the counter value C is reset to a value 0 serving as an initial value. In this case, the picture number is given by the sum of the multiple and the counter value C after the resetting.

After the encoding unit was notified of the picture numbers, whether or not there is a recording operation completing instruction is discriminated (step S212). If the completing instruction is issued (TRUE in step S212), the present operation is finished.

On the other hand, if the recording is continuously executed (FALSE in step S212), the processing routine advances to step S205, the apparatus enters a standby state of the sync signal detection, and the above series of steps are repeatedly executed.

The decision of the picture numbers and the notification processing operation to the encoding unit are executed as mentioned above.

Figure 4:
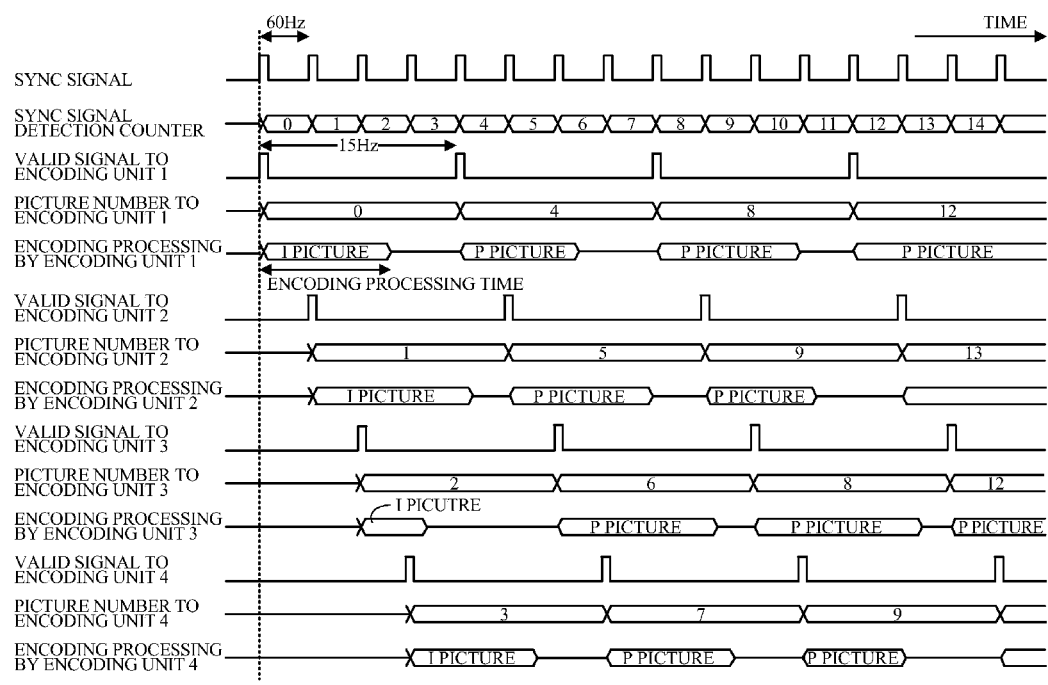
FIG. 4 is a diagram illustrating operation timing of the moving image encoding apparatus according to the first embodiment of the invention.

Since the picture numbers which are notified to each encoding unit are only the sync signal counter value as mentioned above, they correspond to the order of pictures of the input image signal in a one-to-one correspondence relational manner. For example, the picture numbers which are notified to the first encoding unit 105 are equal to 0, 4, . . . as illustrated in FIG. 4. That is, when considering one encoding unit, the picture number notifying unit 104 notifies the encoding unit of the counter value C as a picture number while giving a skip of an offset amount corresponding to the number of encoding units. Such an offset is given by repeating the coincidence comparison to the remainder R. Therefore, the picture number which is set in each encoding unit corresponds to the number of frame of the input image signal and a duplication between them is not resulted, thereby making a composition of the bit streams, which will be described hereinafter, easy.

Picture Number Receiving Operation

Figure 3:
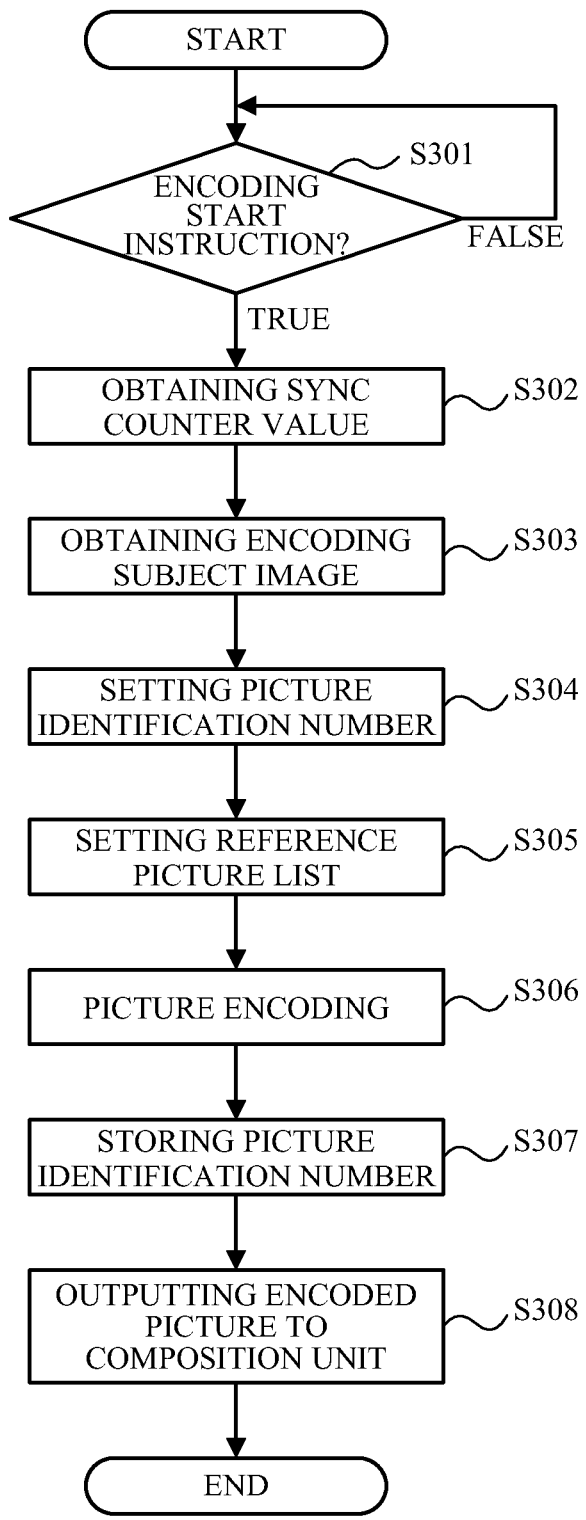
FIG. 3 is a flowchart illustrating the operation of each of a plurality of encoding units according to the first embodiment of the invention.

Subsequently, the operation at the time when each encoding unit has received the picture number notification will be described with reference to a flowchart of FIG. 3.

First, whether or not each of the parallel encoding units mentioned above has received the picture number from the picture number notifying unit 104 and the encoding start instruction is discriminated (step S301).

Until the encoding start instruction is received, the standby state is held without executing the picture encoding (FALSE in step S301).

When the encoding start instruction is received (TRUE in step S301), the sync counter value C (picture number) which is notified at the same timing as the start instruction is obtained (step S302).

Frame image data of the input image signal to be subjected to encoding, which is transferred from the distribution unit 101, is obtained and is written into the frame memory 106 to be developed (step S303).

The frame image data which is written into the frame memory 106 becomes a source image prior to encoding and becomes a processing target of an information compression in the space direction using a frequency conversion based on the image data and an information compression for encoding only inter-frame difference information in the time direction provided by a motion prediction.

In the encoding method by the inter-frame prediction, it is standardized that unique identification numbers are allocated in order to identify which picture data is accessed using the already-encoded picture data corresponding to the future or past in the time direction is used as a reference image.

Particularly, according to the encoding method by H.264, since a plurality of picture data for motion prediction can be held as such a reference image, it is necessary to transmit the reference relation of the relevant encoded picture, as header information, in a form of data of a reference picture list in which the identification numbers are set into a list structure.

From the above reasons, at a point of time when the encoded picture data which is output from each encoding unit is combined to thereby form one bit stream, if such a data structure that the picture numbers overlap is obtained, it does not comply with the standard and the data cannot be correctly decoded to be displayed.

In the present embodiment, by using during the recording operation such a processing that the sync signal counter value C is updated so as to be a unique value on a time unit basis which is equivalent to that of the picture encoding, the counter value is set as a picture identification number (step S304).

Specifically, the sync counter value C is set into a frame identifier (frame_num) described into a slice header (slice_header) which is encoded on a picture basis.

Further, the reference picture list (reference picture list) serving as information showing the reference relation between the pictures is set into the slice header (step S305) in a manner similar to the method of the embodiment disclosed in the Official Gazette of Japanese Patent Registration No. 04389883.

At this time, it is assumed that a reference frame identifier (ref_id) and the frame identifier (frame_num) are associated by using the current sync counter value C obtained in step S302 and the value of the previous picture number stored in step S307, which will be described hereinafter.

In step S306, the frame image data written in the frame memory 106 is compression encoded on the basis of encoding parameters such as header information, quantization coefficient, and the like.

After completion of the encoding, the picture identification number set in step S304 is held in a storage medium such as a RAM or the like (not shown) and is used to form the reference relation between the pictures when the picture encoding processing is executed by the encoding unit at the next time (step S307).

The encoded picture data generated by the encoding unit in step S306 is sent to the composition unit 110 and combined to one bit stream data to be output (step S308).

In this manner, the operation in the moving image encoding apparatus at the time of receiving the picture number setting according to the invention.

Example of Operation Timing

Subsequently, operation timing of each encoding unit at the time when the operation according to the present embodiment mentioned above is executed is illustrated in FIG. 4.

In the diagram, the sync signal which is output from the distribution unit 101 mentioned above, the counter value C of the sync signal counter unit 103, the picture number which is notified to each encoding unit from the picture number notifying unit 104, and the valid signal corresponding to the encoding start timing are illustrated. The picture number is the counter value C which is notified when the valid signal is transmitted.

An encoding picture type about the four parallel encoding units constructed in a manner similar to the moving image encoding apparatus of the embodiment illustrated in FIG. 1, a picture identification number (counter value C which is notified and set), and a picture encoding execution state are illustrated in the diagram, respectively.

In the example shown in FIG. 4, the input image signal is input by the sync signal of a frame rate of 60 Hz and the counter value C is incremented by 1 synchronously with a leading edge of the sync signal.

When the remainder R of the counter value C and the number (=4) of encoding units coincides with the identification number IDN allocated to each encoding unit as described with reference to the operation flow of FIG. 2, the valid signal is issued to the relevant encoding unit.

An issuing period of the valid signal is equal to a frame rate of 15 Hz (=about 66 msec) provided by dividing the frame rate of 60 Hz of the input image signal by the number N (N=4) of parallel encoding units.

If there is even such a period of time during which the above frame rate can be guaranteed, the resolution per encoding unit, with which the picture encoding can be performed, can be raised.

By setting the sync signal counter value obtained when the valid signal is effective as it is as a picture identification number at the time of the picture encoding, in the composition unit 110 in the post stage, it is sufficient to output the encoded picture as it is without updating the header information.

Similarly, even in the case of encoding the P picture using the inter-frame prediction of the second and subsequent times, it is sufficient to generate the reference picture list using the picture number which has previously been set.

Merely by sequentially and circulatively designating the picture numbers to the parallel encoding units as a whole moving image encoding apparatus as mentioned above, an encoding construction in which the encoding units independently perform the picture encoding can be realized.

Output Data Structure of Each Encoding Unit

Figure 5:
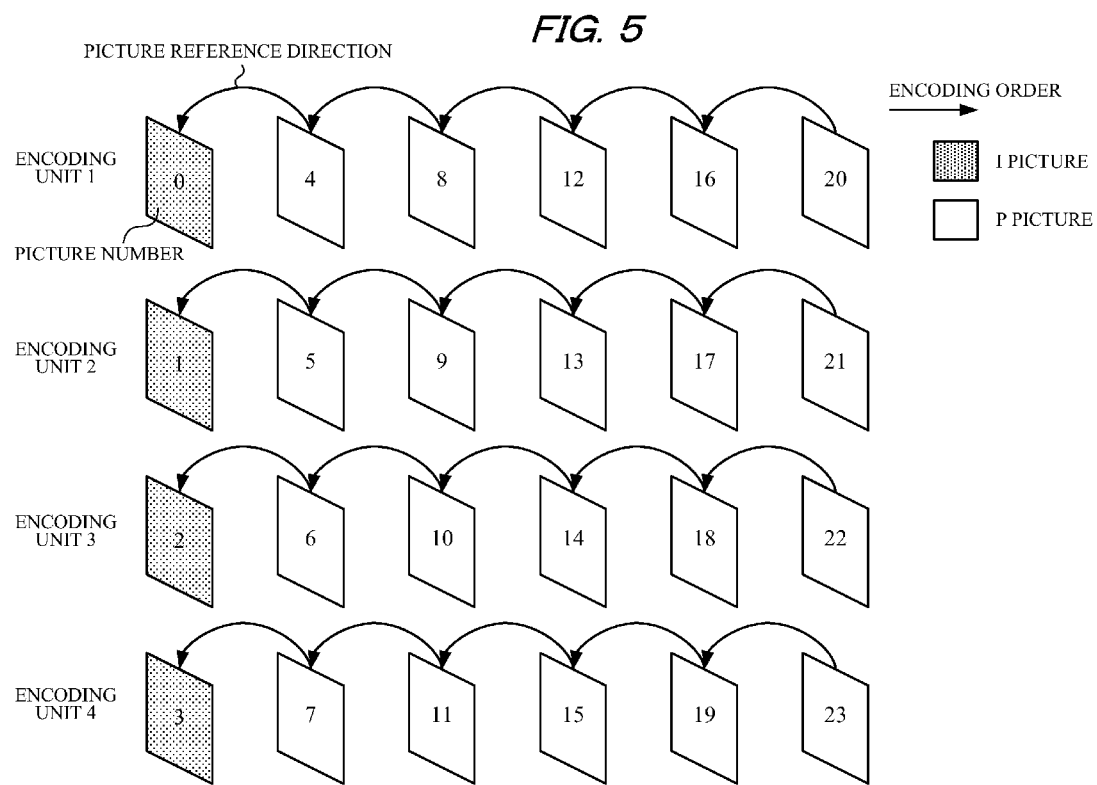
FIG. 5 is a diagram illustrating a structure of picture data which is output by each encoding unit according to the first embodiment of the invention.

Subsequently, a data structure of the bit stream which is output from each encoding unit at the time when the above-described operation of the present embodiment is executed is illustrated in FIG. 5.

Each encoding unit sequentially outputs the encoded picture data in an encoding order of an I picture and, subsequently, a P picture at a time interval at the maximum provided by frequency dividing the frame rate of the input image signal by the number of four parallel encoding units.

The encoding unit 1 outputs the encoded data having such a picture reference relation based on the motion prediction that it starts from the I picture of the picture number 0, and subsequently, the P picture of the picture number 4, which refers to the I picture, and the P picture of the picture number 8, which refers to such a P picture, follow.

Each of the encoding units 2, 3, and 4 also similarly outputs the encoded picture data having a similar picture reference relation although the picture numbers differ.

As mentioned above, the picture reference relation has such a structure that it is referred to only for the picture data encoded by the same encoding unit without being mutually referred to by the encoding units.

Output Data Structure of Composition Unit

Figure 6:
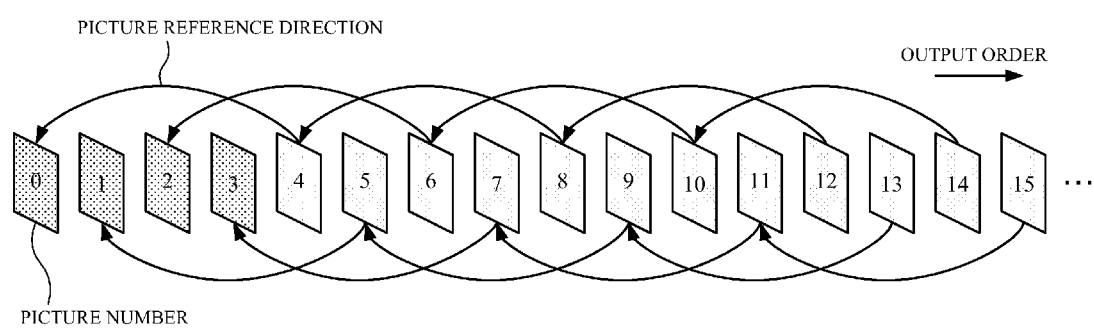
FIG. 6 is a diagram illustrating a structure of stream data which is output by the moving image encoding apparatus according to the first embodiment of the invention.

Subsequently, a data structure of an output bit stream of the composition unit 110 at the time when the above operation in the embodiment is executed is illustrated in FIG. 6.

The encoded picture data which is output from each encoding unit mentioned above is combined into such one bit stream that the picture numbers are set in ascending order while keeping the reference relation between the pictures, and the bit stream is output by the composition unit 110.

The composition of the bit stream has such a construction that it can be realized even if the encoding-completed picture data is sequentially and circulatively received and output, as it is, from each encoding unit at the timing illustrated in FIG. 4 mentioned above.

However, it is assumed that if there is additional information to be multiplexed as a bit stream in accordance with necessity, it can be inserted therein on a picture unit basis.

As mentioned above, the bit stream after the composition has such a data structure that it has unique picture identification numbers, the reference relation between the pictures is correctly held, and it conforms with the standard of the encoding method. Therefore, even if the bit stream is supplied as it is to a decoder apparatus out of the system, it can be decoded and reproduced.

As mentioned above, according to the moving image encoding apparatus of the present embodiment, the encoding system in which a plurality of encoded picture data obtained by the parallel encoding processings by a plurality of encoding units are multiplexed into one stream can be realized by the simple construction.

Embodiment 2

In the first embodiment, the method whereby the sync signal which is transmitted from the input image signal on a frame basis is detected and the sync signal counter value C is sequentially and circulatively set as a picture identification number into each encoding unit and encoded synchronously with the sync signal has been described.

According to the second embodiment, such an operation that a plurality of continuous frames can be encoded in each encoding unit and a bit stream of a desired GOP structure is output is executed as an operation different from that in the first embodiment.

By such an operation, even in the case where the number of encoding units which can be installed in parallel has an upper limit due to a restriction of resources or bus band on the system construction and there is not so large allowance in a function which is required for each encoding unit, the encoding processing performance can be maximized.

The second embodiment of the invention will be described hereinbelow with reference to the drawings.

In the description of the second embodiment, portions common to those in the first embodiment mentioned above are denoted with by the same reference numerals and their description is properly omitted.

System Construction

Figure 7:
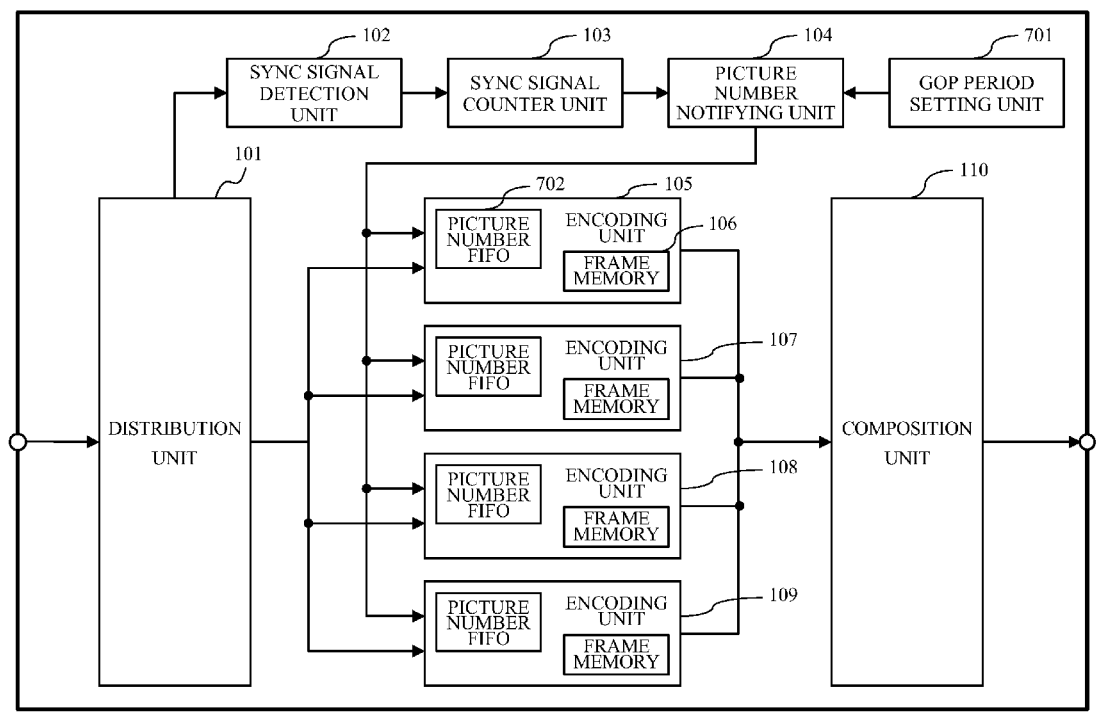
FIG. 7 is a block diagram of a moving image encoding apparatus according to the second embodiment of the invention.

A block diagram of a moving image encoding apparatus according to the second embodiment is illustrated in FIG. 7.

The moving image encoding apparatus of the present embodiment is characterized by having a GOP period setting unit 701 and a picture number FIFO 702 in addition to the construction of the first embodiment. Other construction is similar to that of the first embodiment. The GOP period setting unit 701 obtains GOP structure information of the bit stream to be encoded and output by the present system from the system controller such as a CPU or the like (not shown) and transmits the information to the picture number notifying unit.

The picture number notifying unit 104 newly has a unit for discriminating an encoding unit for continuously performing the picture encoding on a GOP unit basis on the basis of the counter value C of the sync signal detection counter unit and the GOP structure information.

It is assumed that the picture number FIFO 702 is individually built in all of the encoding units and the sync signal counter value notified by the picture number notifying unit 104 is stored into a FIFO memory.

At the same time, in the encoding unit, the sync signal counter value stored in the FIFO memory is extracted at predetermined timing and set as a picture identification number which is used at the time of the picture encoding.

Although a specific data structure of the FIFO memory is not particularly limited in the invention, it is assumed that it has an enough size which can hold the sync signal detection counter value and has ports which can be accessed from both of the picture number notifying unit 104 and each encoding unit.

It is assumed that, upon installation, it is desirable to have a queue number of the picture number stored in the FIFO memory, a designation destination pointer which is used for the picture number notifying unit 104 to queue the picture number into the FIFO memory, and a pointer which is used to extract the picture number from each encoding unit.

Since functions of other blocks are similar to those in the first embodiment, their description is omitted here.

Figure 8:
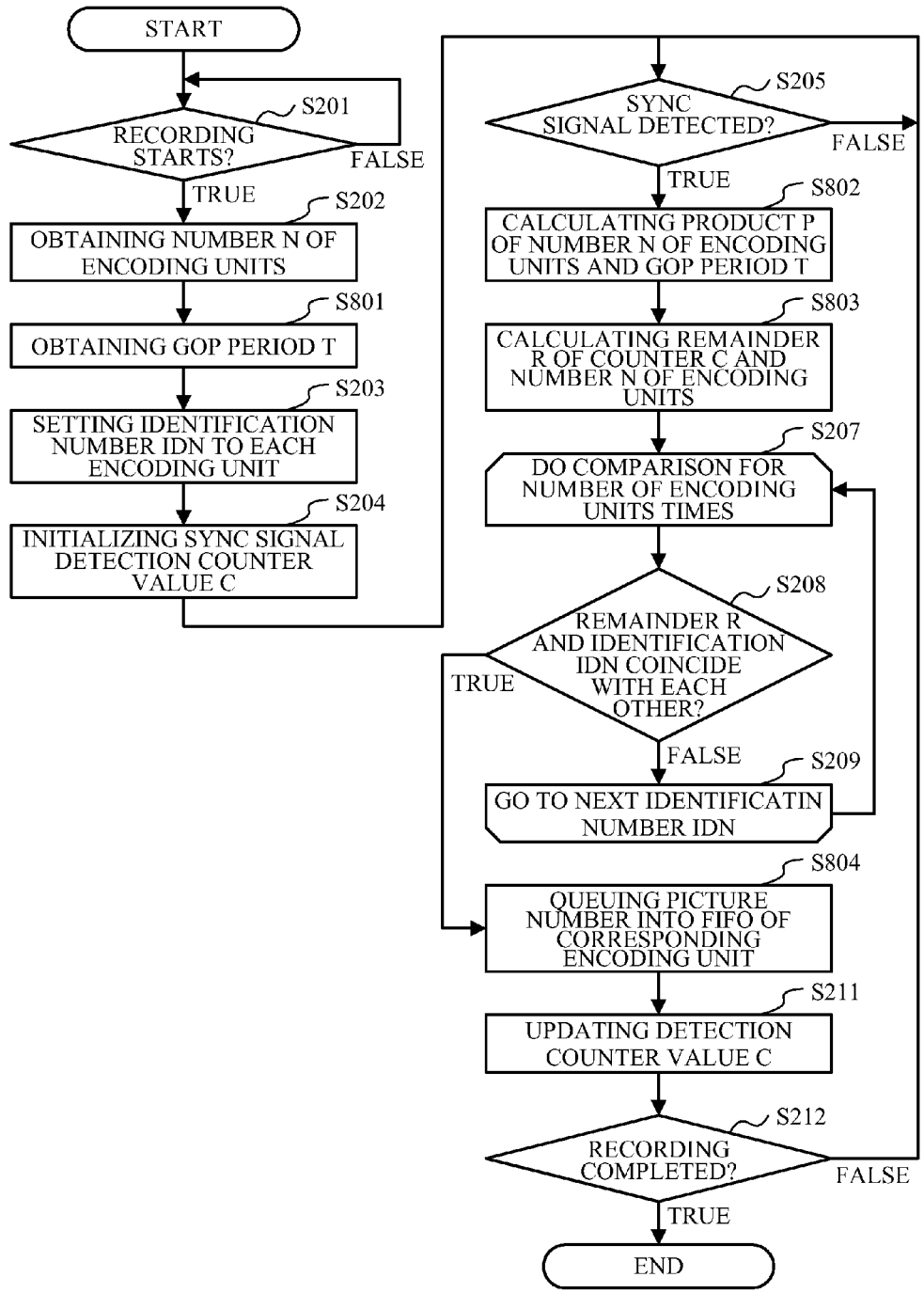
FIG. 8 is a flowchart illustrating the operation of a picture identification number setting unit according to the second embodiment of the invention.
Figure 9:
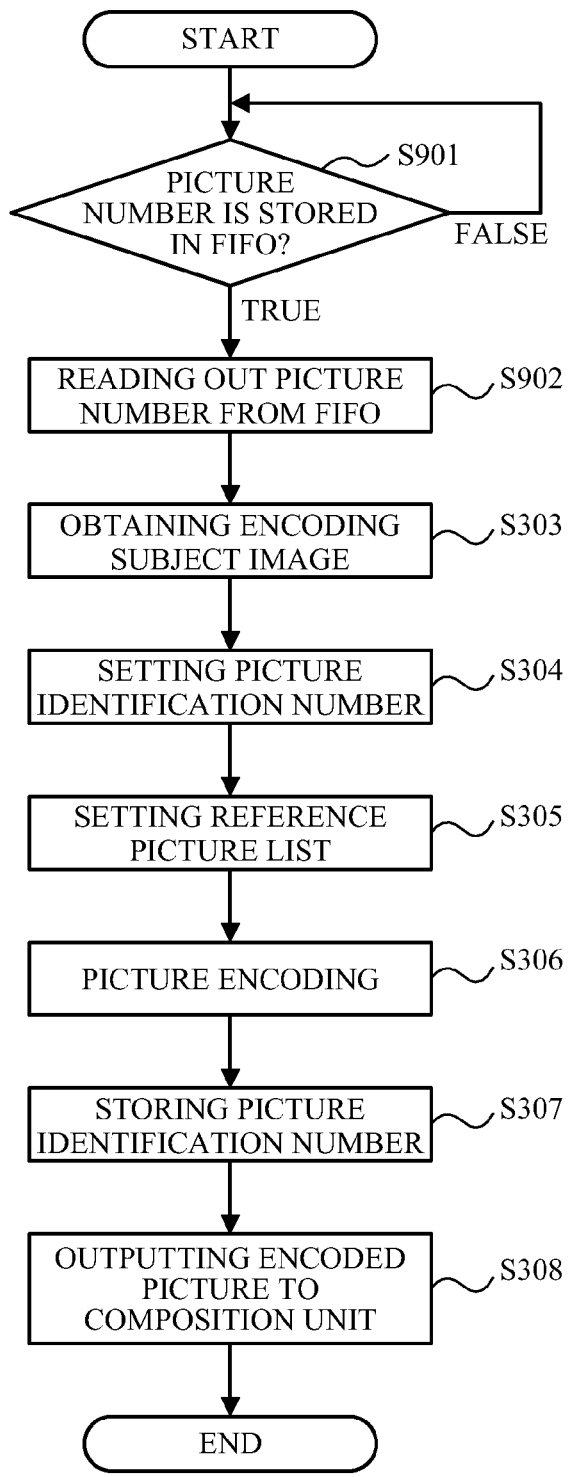
FIG. 9 is a flowchart illustrating the operation of each encoding unit according to the second embodiment of the invention.

Subsequently, the operation of the moving image encoding apparatus according to the second embodiment will be described with reference to FIGS. 8 and 9. The operation can be also realized by a method whereby the system controller (not shown) loads the control program corresponding to flowcharts and executes it in a manner similar to the first embodiment. At least a part of the operation can be also constructed by hardware.

Picture Number Notifying Operation

The decision of the picture number and the notifying operation to the encoding unit serving as a feature of the embodiment will be described with reference to a flowchart of FIG. 8.

The operation is started from timing when the moving image encoding apparatus is shifted to the recording state in a manner similar to the first embodiment.

After the number N of parallel encoding units constructing the moving image encoding apparatus is obtained in step S202, a GOP period T is obtained from the GOP period setting unit 701 (step S801).

The GOP period T indicates the number of pictures in a range from the I picture to the next I picture which are continuously picture-encoded by one encoding unit.

For example, when T=2, each encoding unit repeats such a sequence that the I picture encoding is executed and the P picture encoding is subsequently executed.

Further, if there is a restriction in a capacity of the frame memory in the encoding unit, it is also possible to construct in such a manner that such an encoding restriction that only just-precedent I picture is referred to by the second P picture and the I or P picture of the previously-encoded GOP is not referred to is preliminarily provided and a bus occupancy ratio is reduced.

Subsequently, although the identification number IDN of each encoding unit is allocated thereto in a manner similar to step S203 in the first embodiment, the second embodiment differs from the first embodiment with respect to that the identification number to be allocated changes in accordance with a value of the GOP period T.

For example, when the number N of encoding units is equal to 4 (N=4) and the GOP period T is equal to 2 (T=2), 0 and 1 are allocated as IDN corresponding to the first encoding unit, 2 and 3 are allocated to the second encoding unit, 4 and 5 are allocated to the third encoding unit, and 6 and 7 are allocated to the fourth encoding unit, respectively. That is, the numbers of 0 to NXT−1 (=7) are allocated to each encoding unit every T numbers. Thus, in a manner similar to the first embodiment, each encoding unit can continuously perform the picture encoding twice in accordance with the result of the coincidence comparison between each of the two identification numbers IDN which are allocated and the remainder R. Although not particularly limited in the embodiment, the allocation of the identification numbers IDN and the encoding unit to be subjected to the setting may be preliminarily generated and managed as a data structure of a table type.

Step S204 is similar to that in the first embodiment.

Subsequently, after the sync signal is detected (TRUE in step S205), a product P of the number N of encoding units and the GOP period T is calculated on the basis of the following equation (2) (step S802).

$$P = T \times N \qquad (2)$$

Further, the remainder R provided by dividing the sync signal detection counter value C by the product P is calculated on the basis of the following equation (3) (step S803).

$$R = C \bmod P \qquad (3)$$

By using the remainder R, the encoding unit to which the picture number is notified can be easily decided by the coincidence comparison with the identification numbers IDN in a manner similar to the first embodiment. That is, steps S207 to S209 are executed in a manner similar to the first embodiment.

After the encoding unit to be subjected to the notification of the picture number is decided (TRUE in step S208), the picture number is notified to the picture number FIFO 702 of the target encoding unit by queuing (step S804).

Subsequently, after the detection counter value is updated in step S211 in a manner similar to the first embodiment, the processing routine advances to step S211 for discriminating whether or not the recording is completed.

Although the notification of the picture number and the notification of the encoding start instruction are issued at the same timing as the sync signal detection in the first embodiment, only the picture number is notified by a FIFO mechanism in the second embodiment.

By providing the above FIFO mechanism, the notification of the picture number and the timing for obtaining and receiving the picture image data are made asynchronous, thereby enabling a margin of picture encoding processing time of the encoding unit to be left.

The notifying operation of the picture number has been described above.

Picture Number Receiving Operation

Subsequently, the operation at the time when the picture number notification is received in each encoding unit will be described with reference to a flowchart of FIG. 9.

First, whether or not the picture number set by the picture number notifying operation is stored in the picture number FIFO 702 is discriminated (step S901).

It is assumed that a processing for inquiring of the FIFO 702 about the presence or absence of the setting value is executed at both of the periodic timing corresponding to the foregoing sync signal detection and the timing upon completion of the picture encoding, thereby enabling continuous frame image data to be encoded.

If there is no picture number setting in the picture number FIFO 702 (FALSE in step S901), the picture encoding processing is not executed and the standby state is held until the picture number is set. That is, the embodiment is constructed in such a manner that the setting of the picture number into the picture number FIFO 702 provides the timing for fetching the encoding subject image. That is, in accordance with the setting of one picture number into the picture number FIFO, a moving image signal is fetched from the distribution unit 101 and encoded on a frame basis in a manner similar to the first embodiment. Such a processing is continuously repeated at the period of GOP.

On the other hand, if the picture number is designated (TRUE in step S901), the picture number which is set first is extracted from the FIFO 702 (step S902).

After that, steps S303 to S307 are executed in a manner similar to the first embodiment and the present operation is finished.

The operation in the moving image encoding apparatus at the time when the picture number setting is received in the second embodiment of the invention is executed as mentioned above.

Example of Operation Timing

Figure 10:
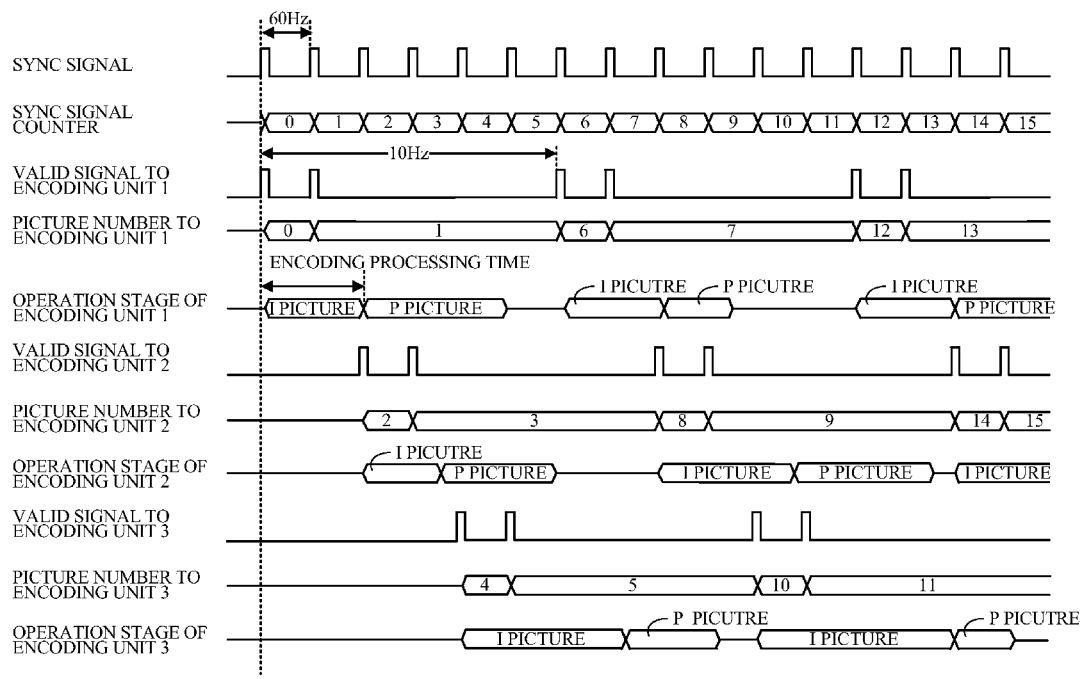
FIG. 10 is a diagram illustrating operation timing of the moving image encoding apparatus according to the second embodiment of the invention.

Subsequently, operation timing of each encoding unit at the time when the foregoing operation of the embodiment is executed is illustrated in FIG. 10.

In the example illustrated in the diagrams, an encoding construction in which three encoding units are arranged in parallel, the GOP period is set to two pictures of the I picture and the P picture, and the encoding is repeated twice is used.

In a manner similar to the first embodiment, the sync signal of the input image signal is output from the distribution unit 101 at a period of 60 Hz and the counter value is incremented synchronously with the sync signal.

Since P=6 from the number N of encoding units (N=3) and the GOP period T (T=2) by the equation (2), the notification of the picture number to each encoding unit is continuously executed twice when R=0 and 1 for the encoding unit 1, R=2 and 3 for the encoding unit 2, and R=4 and 5 for the encoding unit 3.

With respect to each encoding unit, the period at which the picture number is notified is equal to 10 Hz, that is, an interval of 100 msec. If the apparatus has such processing performance that two pictures can be encoded within such a period, the encoded image can be converted into a high resolution image.

Since the timing for notification of the picture number from the picture number notifying unit 104 and the timing for performing the encoding by using the picture number are set so that they can be asynchronously accessed by the picture number FIFO 702, a margin can be assured in the encoding processing time so long as the notification period is equal to or shorter than the time (50 msec) that is the half of 10 Hz as an average in two pictures.

Output Data Structure of Encoding Unit

Figure 11:
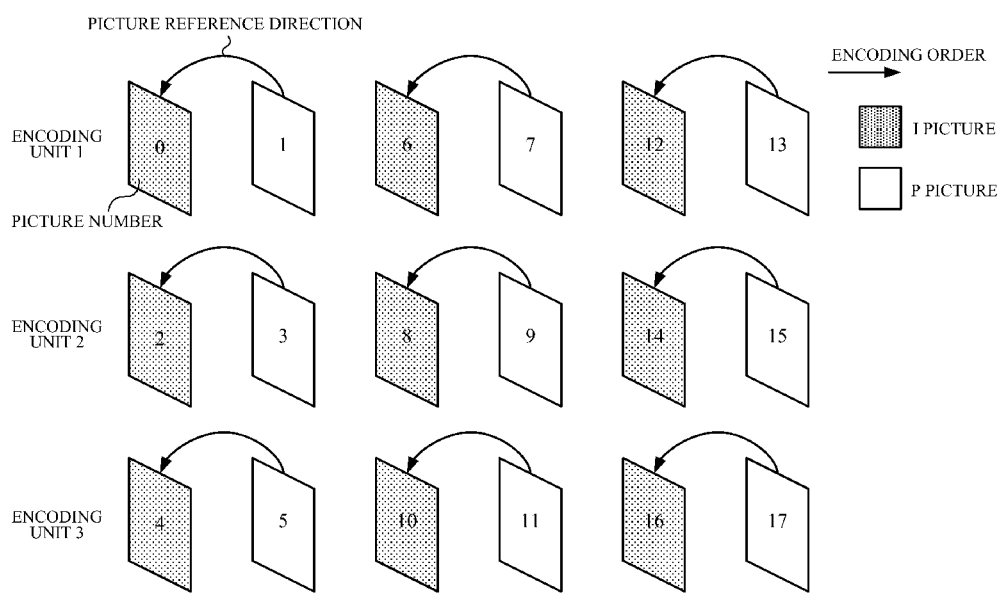
FIG. 11 is a diagram illustrating a structure of picture data which is output by each encoding unit according to the second embodiment of the invention.

Subsequently, a data structure of the output bit stream of each encoding unit at the time when the foregoing operation of the embodiment is executed is illustrated in FIG. 11.

FIG. 11 is a data construction in the case where three encoding units are arranged in parallel and each encoding unit continuously performs the picture encoding twice while setting the I picture and the P picture into the GOP period in a manner similar to FIG. 10.

The encoding unit 1 generates the encoded pictures in order of the I picture of the picture number 0, the P picture of the picture number 1, thereafter, the I picture of the picture number 6, and the P picture of the picture number 7.

Since the P picture refers only to the just-precedent I picture, the image data held in the frame memory of the encoding unit as a reference picture is only one picture.

Although the image quality cannot be improved from a viewpoint of encoding efficiency using the inter-frame prediction, a saving effect of memory resources can be expected.

Similarly, also with respect to the encoding units 2 and 3, although the picture numbers differ, the encoded picture data having the same picture reference relation is output.

Output Data Structure of Composition Unit

Figure 12:
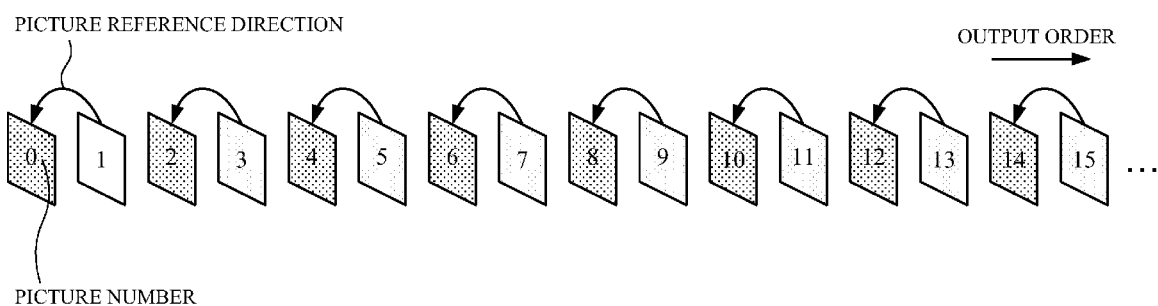
FIG. 12 is a diagram illustrating a structure of stream data which is output by the moving image encoding apparatus according to the second embodiment of the invention.

Subsequently, a data structure of the output bit stream of the composition unit 110 at the time when the foregoing operation of the embodiment has been executed is illustrated in FIG. 12.

Also in the present embodiment, in a manner similar to the first embodiment, if the picture data which is encoded completely, in the diagram is sequentially received from each encoding unit at the timing illustrated in FIG. 10 and is output as it is, the composition of the bit stream is realized.

The bit stream after the composition has the unique picture identification numbers allocated in ascending order and the data in which the reference relation between the pictures is correctly held and which conforms with the standard can be obtained.

Also according to the present embodiment, the encoding system in which a plurality of encoded picture data obtained by the parallel encoding processings by the plurality of encoding units are multiplexed into one stream can be realized by a simpler construction. Further, an encoding system which can easily cope with even a case where the number N of encoding units or the GOP period were changed can be constructed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-215128, filed on Sep. 29, 2011, which is hereby incorporated by reference herein in its entirety.

What is claimed is:

1. A moving image encoding apparatus for encoding a moving image signal, comprising:
    a plurality of encoding units configured to encode the moving image signal and output encoded data;
    a distribution unit configured to output the input moving image signal on a frame basis to each encoding unit;
    a composition unit configured to multiplex the encoded data which is output from each encoding unit to output a bit stream;
    a counter unit configured to count a sync signal of a frame of the input moving image signal; and
    a notifying unit configured to decide a picture number for identifying the frame which is encoded by each encoding unit, on the basis of a count value of the counter unit and a value corresponding to the number of the plurality of encoding units and notify each encoding unit of the picture number of the frame which is encoded by the encoding unit,
    wherein each encoding unit obtains the image signal of the frame to be subjected to encoding among the input moving image signal, from the distribution unit on the basis of the picture number notified from the notifying unit and encodes the obtained image signal.

2. An apparatus according to claim 1, wherein the notifying unit notifies each encoding unit of an identification number of a value which is unique to each frame of the input moving image signal, as the picture number.

3. An apparatus according to claim 1, wherein in accordance with order in which each frame of the input moving image signal is encoded by each encoding unit, the notifying unit decides the encoding unit which is notified of the picture number.

4. An apparatus according to claim 1, wherein the notifying unit notifies each encoding unit of an encoding start instruction together with the picture number, and
    wherein each encoding unit obtains the image signal of the frame to be subjected to encoding, from the distribution unit in accordance with a reception of an encoding start instruction.

5. An apparatus according to claim 1, wherein the notifying unit allocates identification numbers IDN of 0 to N−1 to the encoding units on the basis of the number N of the plurality of encoding units, calculates a remainder R by dividing the count value C of the counter unit by the number N of the plurality of encoding units, decides the count value C as the picture number, and notifies the picture number to the encoding unit to which the identification number IDN which coincides with the remainder R is has been allocated.

6. An apparatus according to claim 1, further comprising a setting unit configured to set a GOP period of the encoded data which is output from the encoding unit, and
    wherein the notifying unit decides the picture number on the basis of the set GOP period, the count value, and the number of the plurality of encoding units and notifies each encoding unit of the picture number, and
    wherein the encoding unit has a storage unit configured to store the picture number notified from the notifying unit, obtains the image signal of the frame to be subjected to encoding, from the distribution unit in accordance with the picture number being stored in the storage unit, and encodes the image signal.

7. An apparatus according to claim 1, wherein the counter unit counts vertical sync signals included in the input moving image signal.

8. An apparatus according to claim 6, wherein the notifying unit allocates the numbers of 0 to (T×N−1) to each encoding unit every T numbers as the identification numbers IDN on the basis of the number N of the plurality of encoding units, the count value C, and a value of the GOP period T, calculates a remainder R by dividing the count value C by a product of the number N of the plurality of encoding units and the GOP period T, decides the count value C as the picture number, and notifies the picture number to the encoding unit having the identification number IDN which coincides with the remainder R.

9. An apparatus according to claim 1, wherein each encoding unit prediction encodes the moving image signal, sets the current notified picture number into a frame identifier of a slice header, and generates a reference picture list showing a reference relation between the frame identifier and a reference frame identifier of the frame which is referred to in the prediction encoding, on the basis of the previous notified picture number, and wherein the composition unit multiplexes the encoded data in accordance with the frame identifier set in the slice header.

10. A moving image encoding apparatus for encoding a moving image signal, comprising:

a plurality of encoding units configured to encode the moving image signal and output encoded data;

a distribution unit configured to output the input moving image signal on a frame basis to each encoding unit;

a composition unit configured to multiplex the encoded data which is output from each encoding unit to output a bit stream;

a setting unit configured to set an identification number which is used to identify each frame of the input moving image signal and has a value which is unique for each frame; and a notifying unit configured to decide the frame which is encoded by each encoding unit and notify each encoding unit of the picture number of the frame which is encoded by the encoding unit, wherein each encoding unit obtains the image signal of the frame to be subjected to encoding among the input moving image signal, from the distribution unit on the basis of the picture number notified from the notifying unit and encodes the obtained image signal.

11. An apparatus according to claim 10, wherein in accordance with order in which each frame of the input moving image signal is encoded by each encoding unit, the notifying unit decides the encoding unit which is notified of the picture number.

12. An apparatus according to claim 10, wherein the notifying unit notifies each encoding unit of an encoding start instruction together with the picture number, and each encoding unit obtains the image signal of the frame to be subjected to encoding from the distribution unit in accordance with a reception of an encoding start instruction.

13. An apparatus according to claim 10, wherein each encoding unit prediction encodes the moving image signal, sets the current notified picture number into a frame identifier of a slice header, and generates a reference picture list showing a reference relation between the frame identifier and a reference frame identifier of the frame which is referred to in the prediction encoding, on the basis of the previous notified picture number, and wherein the composition unit multiplexes the encoded data in accordance with the frame identifier set in the slice header.

14. A control method of a moving image encoding apparatus having a plurality of encoding units configured to encode a moving image signal and output encoded data, a distribution unit configured to output the input moving image signal on a frame basis to each encoding unit, and a composition unit configured to multiplex the encoded data which is output from each encoding unit to output a bit stream, comprising:

a counting step of counting a sync signal of a frame of the input moving image signal;

a notifying step of deciding a picture number for identifying the frame which is encoded by each encoding unit, on the basis of a count value in the counting step and a value corresponding to the number of the plurality of encoding units and notifying each encoding unit of the picture number of the frame which is encoded by the encoding unit; and an encoding step of allowing each encoding unit to obtain the image signal of the frame to be subjected to encoding among the input moving image signal, from the distribution unit on the basis of the picture number notified in the notifying step and encode the obtained image signal.

15. A non-transitory computer-readable recording medium recording a program for causing a computer to function in a control method of a moving image encoding apparatus comprising a plurality of encoding units configured to encode a moving image signal and output encoded data, a distribution unit configured to output the input moving image signal on a frame basis to each encoding unit, and a composition unit configured to multiplex the encoded data which is output from each encoding unit to output a bit stream, as:

a counter unit configured to count a sync signal of a frame of the input moving image signal;

a notifying unit configured to decide a picture number for identifying the frame which is encoded by each encoding unit, on the basis of a count value of the counter unit and a value corresponding to the number of the plurality of encoding units and notify each encoding unit of the picture number of the frame which is encoded by the encoding unit; and the plurality of encoding units each configured to obtain the image signal of the frame to be subjected to encoding among the input moving image signal, from the distribution unit on the basis of the picture number notified from the notifying unit and encode the obtained image signal.

16. A control method of a moving image encoding apparatus having a plurality of encoding units configured to encode a moving image signal and output encoded data, a distribution unit configured to output the input moving image signal on a frame basis to each encoding unit, and a composition unit configured to multiplex the encoded data which is output from each encoding unit to output a bit stream, comprising:

a setting step of setting an identification number which is used to identify each frame of the input moving image signal and has a value which is unique for each frame;

a notifying step of deciding the frame which is encoded by each encoding unit and notifying each encoding unit of the picture number of the frame which is encoded by the encoding unit; and an encoding step of allowing each encoding unit to obtain the image signal of the frame to be subjected to encoding among the input moving image signal, from the distribution unit on the basis of the picture number notified in the notifying step and encode the obtained image signal.

17. A non-transitory computer-readable recording medium recording a program for causing a computer to function in a control method of a moving image encoding apparatus comprising a plurality of encoding units configured to encode a moving image signal and output encoded data, a distribution unit configured to output the input moving image signal on a frame basis to each encoding unit, and a composition unit configured to multiplex the encoded data which is output from each encoding unit to output a bit stream, as:

a setting unit configured to set an identification number which is used to identify each frame of the input moving image signal and has a value which is unique for each frame;

a notifying unit configured to decide the frame which is encoded by each encoding unit and notify each encoding unit of the picture number of the frame which is encoded by the encoding unit; and the plurality of encoding units each configured to obtain the image signal of the frame to be subjected to encoding in the input moving image signal, from the distribution unit on the basis of the picture number notified from the notifying unit and encode the obtained image signal.

\* \* \* \* \*